(12) United States Patent
Turchet et al.

(10) Patent No.: US 6,905,610 B2
(45) Date of Patent: Jun. 14, 2005

(54) METHOD, MODULE AND DEVICE FOR CONTACTING A GAS AND A LIQUID

(75) Inventors: Jean-Pierre Turchet, Hyeres (FR); Bruno Fournel, Vinon/Verdon (FR); Xavier Frechou, Pertuis (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/432,997

(22) PCT Filed: Nov. 28, 2001

(86) PCT No.: PCT/FR01/03762

§ 371 (c)(1),
(2), (4) Date: May 29, 2003

(87) PCT Pub. No.: WO02/43847

PCT Pub. Date: Jun. 6, 2002

(65) Prior Publication Data

US 2004/0051188 A1 Mar. 18, 2004

(30) Foreign Application Priority Data

Nov. 30, 2000 (FR) .............................. 00 15492

(51) Int. Cl.⁷ .................................................. B01F 3/04
(52) U.S. Cl. ...................... 210/760; 210/221.2; 261/76; 261/123; 261/DIG. 75
(58) Field of Search ................................ 210/758, 760, 210/220, 221.2; 261/76, 77, 78.2, 116, 123, DIG. 75

(56) References Cited

U.S. PATENT DOCUMENTS

| | | | |
|---|---|---|---|
| 1,901,806 A | * 3/1933 | Fulton | 239/432 |
| 4,157,304 A | 6/1979 | Molvar | |
| 4,162,971 A | 7/1979 | Zlokarnik et al. | |
| 4,271,099 A | * 6/1981 | Kukla | 261/76 |
| 4,282,172 A | * 8/1981 | McKnight | 261/76 |
| 4,411,846 A | * 10/1983 | Ulrich et al. | 261/98 |
| 5,023,021 A | * 6/1991 | Conrad | 261/76 |
| 5,350,117 A | * 9/1994 | Kleinberger et al. | 239/428.5 |
| 5,437,784 A | * 8/1995 | Meinecke et al. | 209/170 |
| 5,492,655 A | * 2/1996 | Morton et al. | 261/76 |
| 5,556,033 A | 9/1996 | Nachtman | |
| 6,231,648 B1 | * 5/2001 | Marlowe | 96/243 |
| 2004/0036185 A1 | * 2/2004 | Garcia | 261/76 |

FOREIGN PATENT DOCUMENTS

| | | |
|---|---|---|
| FR | 2 773 725 | 7/1999 |
| GB | 458583 | 12/1936 |

* cited by examiner

Primary Examiner—Scott Bushey
(74) Attorney, Agent, or Firm—Pearne & Gordon LLP

(57) ABSTRACT

A method, a module, and a device for gas-liquid contacting. The liquid is sent, in the presence of the gas, in jet form in a first direction onto a wall inclined at an angle of 35–55 degrees with respect to the first direction, the wall dispersing the liquid jet into the gas. The module includes a structure (23, 25) for sending a liquid jet in a first direction, a structure (21) for creating a gas flow, and a wall (11) inclined at an angle of 35–55 degrees.

26 Claims, 4 Drawing Sheets

METHOD, MODULE AND DEVICE FOR CONTACTING A GAS AND A LIQUID

TECHNICAL FIELD OF THE INVENTION

The present invention relates to a method, a module and a device for gas-liquid contacting.

It is applicable to any physical and/r chemical process based on contacting a gas and a liquid in order to bring about, for example, chemical or biochemical reactions or physical exchanges, with or without particles suspended in the gas and/or in the liquid.

PRIOR ART

For example, the processes at present used in industry for dust removal from gaseous wastes by wet means make use of methods whose essential purpose is to present a large contact surface between a gas and a wash liquid. Among the most used methods are washing towers such as those with filling, baffles, beads, etc., venture washers, vortex washers, and rotary washers.

There likewise exist systems of gas-liquid contacting by bubbling, oxygenation or ozonization being an example, and systems of generation of foam by means of a polluted gas in order to remove pollution, or by a clean gas to generate cleaning or decontaminating foams.

Unfortunately these systems have in particular the following disadvantages: they are sensitive to blocking in the case of polluted gas or liquid, they entail a great pressure loss, and/or they do not provide an excellent dispersion of the gas in the liquid.

SUMMARY OF THE INVENTION

The present invention has the precise object of providing a method, a module and a device for gas-liquid contacting, which more particularly remedy the said disadvantages.

In the method of the present invention:

in a substantially horizontal tube immersed in the liquid, from a means for introducing gas into the tube disposed between the first and the second ends of the tube, a gas flow is brought about, filling the tube and being displaced toward the second end of the tube, and the liquid is sent in jet form into the gas flow from the first end of the tube in a first direction substantially parallel to the tube axis and not coming into contact with the tube, onto a wall inclined at an angle of 35–55 degrees with respect to the first direction, the wall-dispersing the liquid in the gas, an opening being provided in the tube in the region of its second end so that the liquid leaves the tube with the gas as soon as the jet is dispersed by the wall.

The term "gas" encompasses everything which is not liquid or solid; it denotes the gaseous state. It can relate to a gas such as a chemical gas, air, smoke, etc.

The jet can be chosen, for example, from among a flat jet, a rectilinear jet, or a full cone jet, preferably a rectilinear jet. The jet can be substantially horizontal, for example. It is preferably sent onto the wall at a pressure between $2\times10^5$ and $5\times10^5$ Pa.

The wall used can advantageously have a free edge, and the jet can advantageously be sent onto the wall in the neighborhood of this free edge. The advantages connected with this embodiment are described in the examples hereinbelow.

Devices for the implementation of the methods of the present invention are described hereinbelow.

The experimental results obtained by the inventors show that the method of the present invention enables an excellent gas/liquid interface to be obtained which optimizes all the methods in which this interface plays a part.

The present invention likewise relates to a method of treatment of wastewater by oxygenation or ozonization of this water, in which the oxygenation or ozonization is effected by means of a method according to the present invention, in which the gas is oxygen or ozone and the liquid is wastewater to be treated.

The present invention likewise provides a method of treating a polluted gas by means of a treatment liquid, the said method comprising a step of contacting the gas and the treatment liquid by means of a method according to the invention, in which the gas is the polluted gas and the liquid is the gas treatment liquid.

According to an embodiment of the invention, the treatment liquid may comprise a foaming agent enabling a foam to be formed from gas to be treated and the treatment liquid, this in order to present a much greater gas/liquid interface than the conventional polluted gas washers. In the case of a foam, this interface is, for example, connected to the size of the bubbles and to the volume of gas to be treated. In the case of conventional washer, for example, this interface is related either to the pair: drop size/wash liquid flow rate, or to the exchange surface implemented, for example, in towers with plates or packing. For similar drop and bubble sizes, it can be estimated that a foam presents 20–30 times more gas/liquid contact surface than a conventional washing system.

The inventors have shown that the present invention furthermore has the following advantages when it uses a foaming agent:

- it enables a homogeneous foam to be generated composed of gas bubbles, for example of a gas to be treated, of diameter less than 2 mm to obtain a large gas/liquid contact surface,
- it gives rise to a small pressure loss and enables gas flows to be treated on the industrial scale,
- it has low sensitivity to blocking which may occur in prior art methods and devices, for example by aerosols carried by the gas,
- it enables flow rates greater than 500 $m^3.hr^{-1}$ to be treated (see device hereinbelow). The gas flow rates mentioned in the present description are all given for conditions of normal temperature and pressure.

The prior art techniques for generation of foam of this quality permit responding only to the first criterion.

Except for mechanical beaters, whose revolving portions may pose problems, the other techniques mainly use porous packings with low interstitial spaces, very sensitive to blocking, which furthermore causes considerable pressure losses. On the other hand, these prior art techniques are generally reserved for the generation of small quantities of foams using gas flow rates of less than 50 $m^3.h^{-1}$.

The method of the present invention, when it uses a foam, can furthermore comprise a step of separation of the treated gas from the foam formed. This separation step can be effected, for example, by means of ultrasound, by chemical means, or by mechanical means.

The present invention likewise relates to the use of the method of gas/liquid contacting according to the invention to perform a chemical or biochemical reaction or a physical exchange with or without particles in suspension in the gas or in the liquid.

The method of the present invention, when it uses a foam, is for example useful in gas depollution or decontamination processes in which the gas and the liquid are to be placed in contact. It can also be used, for example, for dust removal from a gas or smoke arising, for example; from waste incineration, or from any industry where such dust removal is required.

For example, as stated hereinabove, by associating the method of the present invention with the use of a foaming agent in the treatment liquid, it permits the treatment of aerosols and gaseous compounds such as, for example, HCl, $SO_2$, $H_2S$, etc. An aerosol is defined here as a colloidal system in which the dispersion medium is a gas, and the dispersed phase may be either a solid, in the case of a smoke, or a liquid, in the case of a fog.

The present invention likewise provides a module and a device which can be used for performing the method of the present invention.

According to the present invention, the gas/liquid contacting module comprises:

a substantially horizontal tube having a first and a second end, means disposed between the first and the second end of the tube for introducing gas into the tube, means for sending the liquid in the form of a parallel jet in the direction of the second end of the tube, this means being disposed at the level of the first end of the tube, a jet impact wall projecting into the tube in the region of the second end, the wall being inclined at an angle of 35–55 degrees with respect to the tube axis, preferably an angle of 40–50 degrees, and most preferably an angle of 42–47 degrees, the wall having a free edge in the tube and having a position such that the jet comes to impact totally against the said tube in the neighborhood of the said free edge, and an opening provided in the tube in the region of the second end of the tube, so that the jet, dispersed by its impact on the wall, leaves the tube directly.

The means for sending the liquid in the form of a jet can be, for example, a flat jet nozzle, a rectilinear jet nozzle, or a full cone jet nozzle, preferably a rectilinear jet nozzle.

It can be of any material provided that it is chemically resistant to the liquid and to the gas with which it is in contact, and physically resistant to the liquid and gas pressures with which it is in contact. It can, for example, be of polyvinyl chloride (PVC) or of stainless steel.

According to the invention, the tube preferably has a diameter suitable for the quantity of gas and liquid to be placed in contact. The diameter of the tube of the module can be chosen, for example, so that any device manufactured with a module according to the present invention has low sensitivity to blocking for a pressure loss lower than $23\times10^2$ Pa.

The gas flow can be created either by the gas pressure, for example when it is fed into the tube, or by aspirating the gas downstream, for example by creating a reduced pressure downstream of the module. A system functioning with reduced pressure is described in the French Patent Application FR-A-2 773 725.

The introduction of the gas is preferably effected between the nozzle for sending the liquid in jet form and the wall, in order to avoid clogging of the nozzle.

The impact wall may be disposed, for example, such that it disperses the liquid jet downward. The material constituting it can be the same as or different than that constituting the tube. This material preferably has the said chemical and physical characteristics.

The impact wall advantageously forms a barrier to the gas introduced into the tube, to force the entrainment of the gas by the jet dispersed by the wall. The examples hereinbelow indeed show that this implementation of the present invention enables a better gas/liquid contact to be obtained.

In the particular embodiment of the present invention, the impact wall may advantageously be fixed to the tube. Indeed, this enables the structure of the module to be simplified.

According to the invention, the wall may, for example, be in the form of a plate.

The wall can project into the tube by about ⅓ of the tube diameter in the particular embodiment of the present invention.

The module of the present invention has the advantages of being less sensitive to blocking, while ensuring, with a low pressure drop, excellent dispersion of the gas in the liquid. Furthermore, the means, for example a nozzle, for sending the liquid to impact against the wall cannot be congested by particles present in a gas or a smoke.

The module of the present invention for example permits the dispersion of 30 $m^3.h^{-1}$ of gas with 1 $m^3.h^{-1}$ of liquid under $2\times10^5$ Pa starting from a tube having a diameter of 28–32 mm.

The present invention likewise relates to a gas/liquid contacting device comprising a plurality of gas/liquid contacting modules according to the invention.

The number and the dimension of the modules are chosen as a function of the gas and liquid flow rates to be treated.

According to an embodiment of the present invention, the contact modules can be fixed in a star formation on a support. The device can comprise 16 modules, for example.

The device of the present invention is of particular interest in permitting the simultaneous contacting of a large quantity of gas and liquid. A modular design according to the present invention for example enables 500 $m^3.h^{-1}$ of gas to be dispersed before being treated by a liquid.

In the case of use of the device with a foaming agent, the device of the present invention may furthermore be coupled to means for separating the gas from the foam which is formed. This means may, for example, be an ultrasonic generator or a turbocentrifuge gas separator.

The quality of the dispersion and the absence of movable elements in the present invention make the said invention very useful for any applications in which gas/liquid contacting is necessary.

The present invention has high performance for a polluted gas based on the generation of a foam, for example, and enables a fine, homogeneous foam to be obtained, formed with the gas to be treated. The destruction of the foam and the separation of the pollutants can then be performed, for example, by a gas turbocentrifuge.

It also has high performance, with or without foam, in processes at present used in industry of wet removal of dust from gaseous effluents, implementing techniques whose essential purpose is to present a large contact surface between a gas and a wash liquid.

Other characteristics and advantages of the present invention will become apparent on reading the following examples, given by way of illustration and without limitation, with reference to the accompanying Figures.

EXAMPLES

Example 1
An Embodiment of a Module According to the Invention

Figure 1:
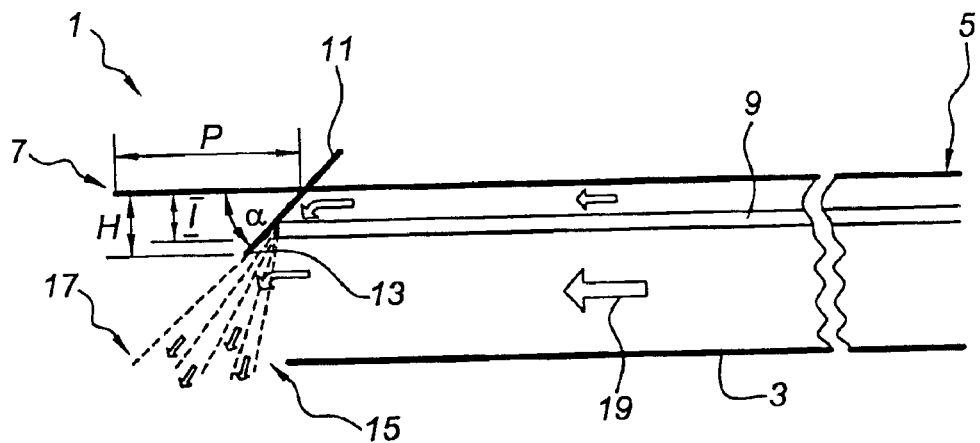
FIG. 1 is a diagram of a sectional view of a module of the present invention.

FIG. 1 is a diagram of a sectional view of the embodiment of a gas/liquid contacting module according to the present invention.

This module comprises a tube 3 comprising first and second ends 5 and 7 respectively, means (not shown) for sending the liquid as a jet 9 into the tube 3 in the direction of the second end 7 of the tube, the jet 9 not coming into contact with the tube 3, this means being disposed in the region of the first end of the tube, and means (not shown) for introducing the gas into the tube between the first 5 and the second 7 end of the said tube.

This device comprises a jet impact wall 11 projecting into the tube 3 in the region of its second end in the form of a plate. This plate 11 is inclined at an angle α with respect to the exis of the tube 3. This plate 11 has a free edge 13 in the tube. It has a position such that the jet totally impacts against it in the neighborhood of the said free edge 13. The plate 11 for impact of the jet 9 acts as a barrier to the gas introduced into the tube, to force the entrainment of the gas by the jet dispersed by the wall. The arrows 19 indicate the flow of gas in the tube, then into the interior of the dispersed jet. The plate 11 is fixed to the tube 3.

An opening 15 is provided in the tube in the region of the second end 7 of the tube, so that the jet 17, dispersed by its impact on the plate 11, directly leaves the tube 3 downward.

In this Figure, P indicates the position of the plate 11 with respect to the end 7 of the tube 3, H indicates the distance of the free end of the plate 11 relative to the top of the tube 3, and I indicates the level of the point of impact of the liquid jet 9 on the plate with respect to the top of the tube 3.

Example 4 below shows the effect of the type of jet used and of the values of α, P, H and I on the gas/liquid contacting according to the method of the present invention.

Example 2
An Embodiment of the Means for Gas Introduction into the Tube of the Module of Example 1

Figure 2:
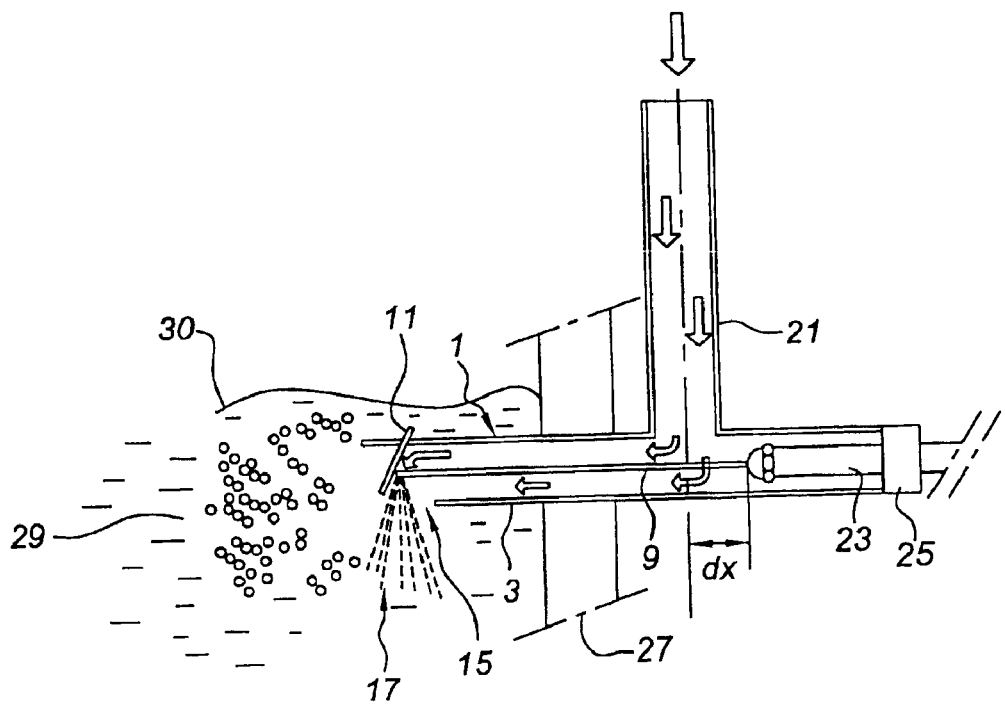
FIG. 2 is a diagram of a sectional view of a module of the present invention, in which is shown an inlet duct for a gas flow.

FIG. 2 is a diagram of a sectional view of the module of the present invention as shown in FIG. 1, furnished with an inlet duct 21 and a gas flow indicated by arrows 19. The reference numerals used in this Figure are identical to those of FIG. 1 for the same elements.

The inlet duct 21 constitutes the means for introducing gas into the tube 3.

In this Figure, the module 1 is shown immersed in a liquid 29 having a level 30. A means 23, 25 for sending the liquid into the tube as a coaxial jet 9 in the direction of the second end 7 of the tube is disposed in the region of the first end 5 of the tube. This means comprises a nozzle with a rectilinear jet 23 and a means 25 for fixing the nozzle. The jet 9 does not come into contact with the tube 3.

The module 1 is fixed to a fixed support 27.

Example 3
Utilization of a Module of the Present Invention

Figure 6:
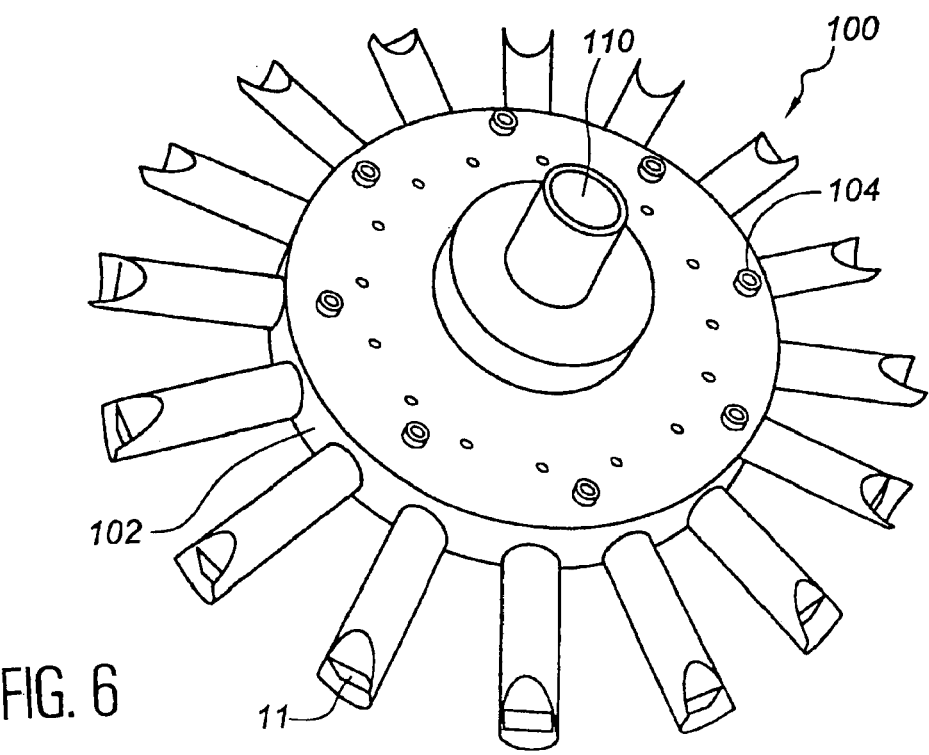
FIG. 6 is a diagram of the device of FIG. 4, seen from below.
Figure 7:
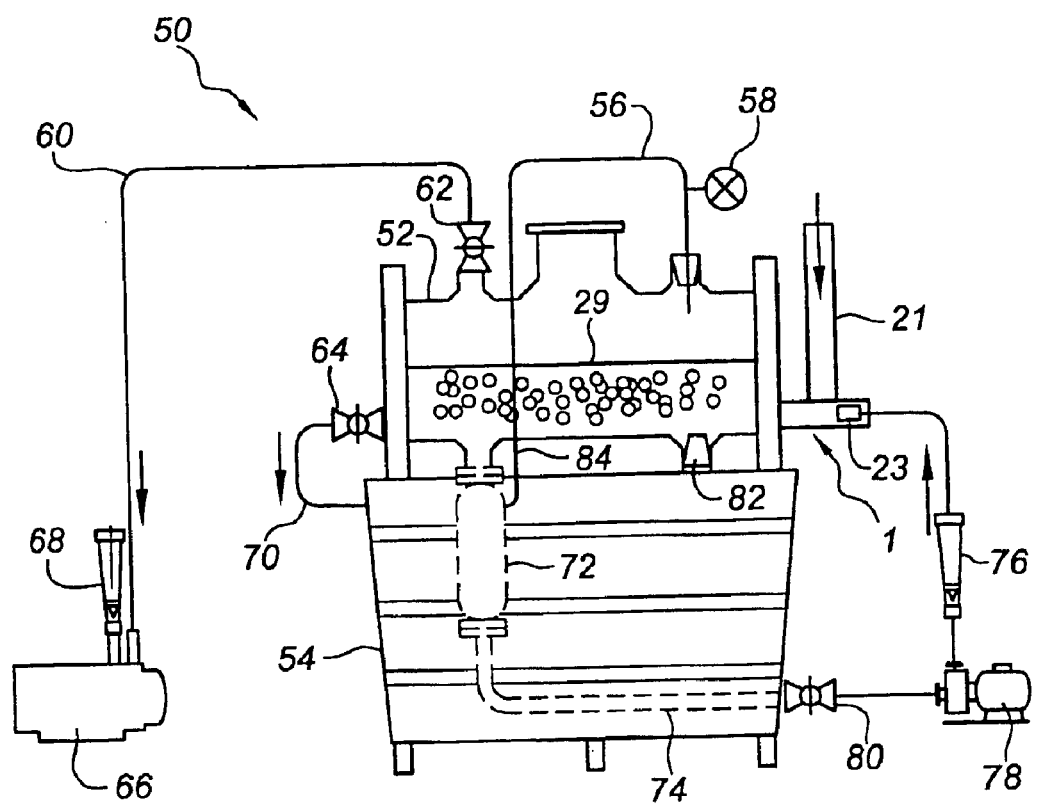
FIG. 7 is a diagram of an experimental device comprising a module according to the present invention for contacting a gas and a liquid, in which the tube is immersed in the liquid.

An experimental device was equipped with the module described in examples 1 and 2 according to the present invention. This device is shown in FIG. 6. Reference numerals identical to those in FIGS. 1 and 2 denote the same elements.

| Reference | Element of the device |
|---|---|
| 1 | module of the present invention |
| 21 | gas inlet duct |
| 23 | nozzle |
| 29 | liquid level |
| 50 | pilot device |
| 52 | glass enclosure |
| 54 | retaining tank |
| 56 | air purge |
| 58 | pressure gauge |
| 60 | suction duct for gas to be treated |
| 62 | regulating valve for flow rate of gas to be treated |
| 64 | drainage valve |
| 66 | vane pump for gas suction |
| 68 | gas outlet flowmeter |
| 70 | drainage tube |
| 72 | air trap |
| 74 | suction duct of liquid recirculation pump |
| 76 | flowmeter |
| 78 | liquid recirculation pump |
| 80 | isolating valve |
| 82 | drainage plug |
| 84 | air purge |

Example 4
Use of the Device of Example 3

This example presents different experiments performed by the inventors to show the performance of the method and of the gas/liquid contact module according to the invention.

A tube without impact plate was first used experimentally, then a tube with impact plate.

Tube without Plate

The Means of Injection

Four types of nozzle were tested. They were principally chosen for their capacity to produce a substantial impact force and different forms of diffusion.

The characteristics of these nozzles for a supply pressure of $2 \times 10^5$ Pa (2 bars) are as follows: flat jet nozzle: orifice diameter (o.d.) 4.8 mm, flow rate (d) 19.3 $l.min^{-1}$, dispersion angle (d.a.) 22 degrees; rectilinear jet nozzle: o.d.=4.4 mm, d=16.1 $l.min^{-1}$; spoon jet nozzle: o.d.=4.8 mm, d=19.3 $l.min^{-1}$, d.a.=45 degrees, and deflection angle of 37 degrees; and full cone jet nozzle: o.d.=4.4 mm, d=16.1 $l.min^{-1}$, d.a.=15 degrees.

The trials were performed with the following configurations: height of the bottom of the enclosure to the axis of the gas inlet tube: 5.1 cm, then 9.6 cm; diameter of the PVC gas inlet tube into the enclosure: 28–32 mm; distance dX=12.5 cm (see FIG. 2); volume of liquid in the device: between 30 and 35 liters; height of liquid in the tank 52: between 10 and 20 cm, this value being taken at the level of the enclosure flange, i.e., a height of liquid of 5–10 cm above the module of the present invention; and gas flow rate: 30 $m^3.h^{-1}$.

In the course of these trials, the influence was measured or observed of the position dX of the nozzle relative to the gas inlet, and of the flow rate of liquid into the nozzle.

The value of the position dX of the nozzle corresponds to the distance of the end of the tube relative to the inlet axis of the gas tube.

The assessment of the efficiency of the system was performed as a function of the gas side pressure loss, equivalent to the difference between the enclosure pressure and the atmospheric pressure, and of the quality of dispersion of the gas in the liquid phase. The latter assessment was essentially visual.

Each type of nozzle was tested at 10 different positions relative to the axis of the gas inlet tube. These positions correspond to advancing the nozzle by increments of 2 cm from the position of maximum withdrawal. The quality and quantity of bubbles generated at each position were assessed visually.

The pressure loss caused by the system was measured at the same time.

Variation of the Position of the Nozzle
Effect on Bubble Generation

The object being to assess the quality of the bubble dispersion created by the module of the present invention without the wall, the trials were performed firstly without surfactants, with the four said nozzles under similar conditions. The observations were made about one minute after starting the two pumps, air and liquid. The waiting time between each measurement was about 5 minutes. The liquid flow rate was a maximum of about 1,100 l.h$^{-1}$. The inlet pressure of the nozzle was 2×10$^5$ Pa (2 bars).

The results obtained are collected in the following Table I and shown in the accompanying FIG. 3.

Figure 3:
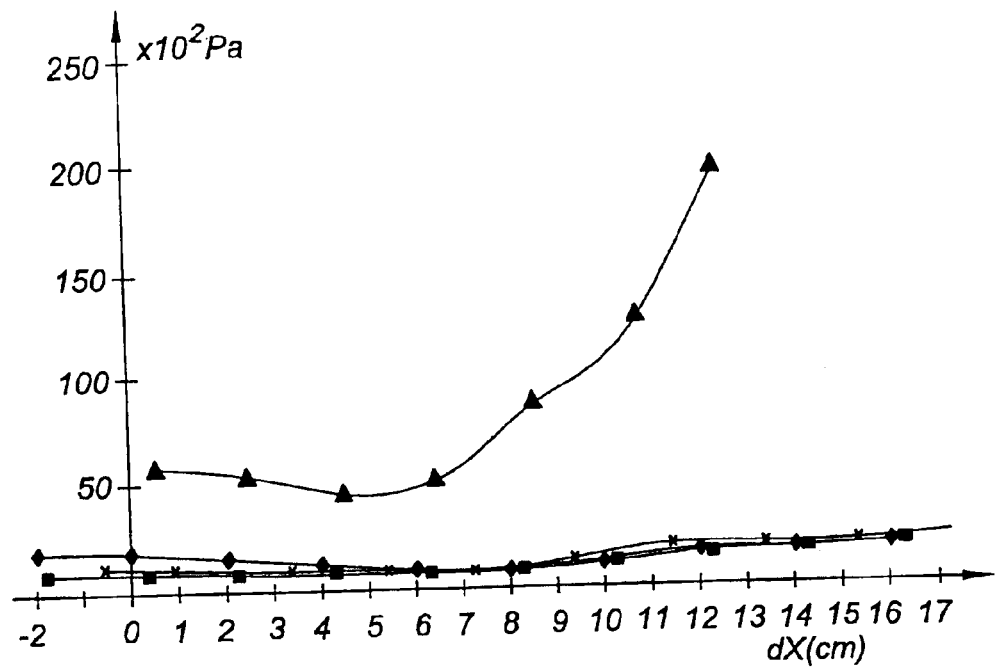
FIG. 3 is a graph showing the pressure loss for each type of nozzle, as a function of their position.

FIG. 3 is a graph showing the pressure losses in Pa for each type of nozzle as a function of their position dX in cm. In this Figure, the curve ■ represents the results obtained for the rectilinear jet nozzle, the curve ▲ represents the results obtained for the spoon jet nozzle, the curve x represents the results obtained for the full cone jet nozzle, and the curve ♦ represents the results obtained for the flat jet nozzle.

The comparison of the results for the four nozzles according to the position dX of the nozzle relative to the axis of the gas inlet tube was performed according to a visually assessed criterion of generation as a function of the size, homogeneity and quantity of the bubbles.

The value of this criterion according to a scale of 0 to 10 is greater, the greater the number of bubbles of small size, that is, <2 mm, and the smaller the number of large bubbles, that is, of size >10 mm.

The effectiveness of 10 is with reference to the best result obtained during these trials. It does not correspond to a total dispersion of gas in the liquid medium.

TABLE I

Effectiveness of different types of nozzle without wall in the module of the present invention

| Nozzle with flat jet | | Nozzle with rectilinear jet | | Nozzle with spoon jet | | Nozzle with full cone jet | |
|---|---|---|---|---|---|---|---|
| dX, cm | Effectiveness | dX, cm | Effectiveness | dX, cm | Effectiveness | dX, cm | Effectiveness |
| −2 | 2 | −1.7 | 3 | 0.5 | 0 | −0.6 | 1 |
| 0 | 3 | 0.3 | 4 | 2.5 | 1 | 1.4 | 1 |
| 2 | 4 | 2.3 | 5 | 4.5 | 2 | 3.4 | 2 |
| 4 | 4 | 4.3 | 6 | 6.5 | 2 | 5.4 | 3 |
| 6 | 5 | 6.3 | 7 | 8.5 | 3 | 7.4 | 4 |
| 8 | 5 | 8.3 | 8 | 10.5 | 4 | 9.4 | 5 |
| 10 | 5 | 10.3 | 8 | 12.5 | 4 | 11.4 | 5 |
| 12 | 5 | 12.3 | 9 | 14.5 | — | 13.4 | 6 |
| 14 | 7 | 14.3 | 10 | 16.5 | — | 15.4 | 6 |
| 16 | 8 | 16.3 | 10 | 18.5 | — | 17.4 | 7 |

Analysis of Results

The best effectiveness was obtained with the nozzle with rectilinear jet and when the nozzles are close to the enclosure.

However, the effectiveness is not very satisfactory, even with the nozzle with rectilinear jet, because a substantial quantity of gas is not dispersed in the liquid and escapes in bubbles of size >20 mm to the upper portion of the injection tube.

Pressure Losses

Table II below shows the pressure losses measured for each type of nozzle as a function of their position.

TABLE II

Pressure loss over the gas flow caused by the nozzles

| Nozzle with flat jet | | Nozzle with rectilinear jet | | Nozzle with spoon jet | | Nozzle with full cone jet | |
|---|---|---|---|---|---|---|---|
| dX cm | × 10$^2$ Pa | dX cm | × 10$^2$ Pa | dX cm | × 10$^2$ Pa | dX cm | × 10$^2$ Pa |
| −2 | 18.4 | −1.7 | 8.2 | 0.5 | 58.3 | −0.6 | 11.1 |
| 0 | 17.8 | 0.3 | 8.5 | 2.5 | 53.5 | 1.4 | 9.0 |
| 2 | 15.5 | 2.3 | 8.3 | 4.5 | 45.0 | 3.4 | 7.9 |
| 4 | 11.3 | 4.3 | 8.9 | 6.5 | 51.5 | 5.4 | 8.3 |
| 6 | 9.9 | 6.3 | 8.5 | 8.5 | 85.0 | 7.4 | 8.2 |
| 8 | 8.4 | 8.3 | 9.7 | 10.5 | 117.0 | 9.4 | 13.4 |
| 10 | 11.5 | 10.3 | 11.5 | 12.5 | 196.0 | 11.4 | 18.9 |
| 12 | 16.1 | 12.3 | 15.4 | 14.5 | | 13.4 | 19.2 |
| 14 | 17.0 | 14.3 | 17.4 | 16.5 | | 15.4 | 20.1 |
| 16 | 19.1 | 16.3 | 20.1 | 18.5 | | 17.4 | 22.9 |

In all cases, an optimum is observed for an intermediate distance dX. This optimum of pressure loss is similar for the flat jet, rectilinear jet, and full cone let nozzles.

Variation of the Liquid Flow Rate

Taking account of the good results obtained with the nozzle with rectilinear jet, measurements were performed with this jet in the maximum withdrawal position of dX=−1.7 cm, in order to permit free passage of gas into the injection tube.

Variations of flow rate were made starting from 200 $l.h^{-1}$ in increments of 200 $l.h^{-1}$. It was observed that the number of bubbles increases proportionally with the flow rate: indeed, with greater speed of the liquid and with greater penetration into the liquid mass.

The trials were carried out at a maximum flow rate of 1.1 $m^3.h^{-1}$.

The Tube with Plate

On the internal wall of the tube, the inventors placed a wall in the form of a plate which perturbs the liquid jet.

In this way, they realized the module of the present invention.

The plate deviates the liquid jet downward, while forming a barrier to the gas flowing in the upper portion of the tube and, in most of the previous trials, causing large-sized bubbles. The liquid jet dispersed by the wall entrains the gas.

The gas flow directed downward is dispersed into the mass of liquid of the enclosure.

In order to improve this system and to define its limits, various modifications were made to the position of the plate. They concern the angle α of the plate with respect to the axis of the tube, the distance P of the plate with respect to the end of the tube, the distance (H) of the free end of the tube relative to the top of the tube, and the point of impact I of the liquid jst on the plate.

Variation of the Angle α of the Plate

The experiments used four angles α: 30°, 47°, 60° and 90°.

With an inclination of 30°, the flow of air in the upper portion of the tube is not completely arrested by the plate, and bubbles of considerable size escape dispersion.

With an inclination of 47°, the dispersion is very satisfactory and the phenomenon observed at 30° has disappeared.

With an inclination of 60°, the deviation is too great and the liquid strikes the lower portion of the tube, resulting in a reduction of the force of impact and consequently a reduction of the dispersion.

At 90°, the gas is impeded at the exit by a liquid barrier: the pressure loss increases greatly, and the dispersion is mediocre.

The best angle was found to be close to 45° in these trials.

Variation of the Height of the Plate

The height of the plate strongly influences the pressure loss, because of the variation of the exit cross section. The plate height providing the best performance for a pressure loss/dispersion compromise corresponds to ⅓ of the tube diameter. So for example, for a 32 mm tube, H may be comprised between 6 and 10 mm.

Variation of the Position of the Plate

The plate is more or less advanced relative to the exit of the tube. The optimum positioning is a distance P equal to a tube diameter from the base of the plate to the end of the tube.

Variation of the Impact of the Jet on the Plate

The inventors determined the influence on the dispersion of the jet of the point of impact of the jet on the plate.

Three trials were performed for this:

No point of impact on the plate; the jet passes below the plate, only the gas is deviated downward.

Half of the jet impacts on the lower portion of the plate.

The whole of the jet impacts on the plate at its lowest point.

The effect of an impact at the top of the plate is identical to that of a plate disposition at 90°.

The trials showed that the jet totally impacting on the lower portion of the plate gives the best results.

Example 5

Device Using the Module of the Present Invention

Starting from the design elements collected in the preceding example, a device according to the present invention was produced.

This device was made for treating a gas flow of 500 $m^3.h^{-1}$.

Figure 4:
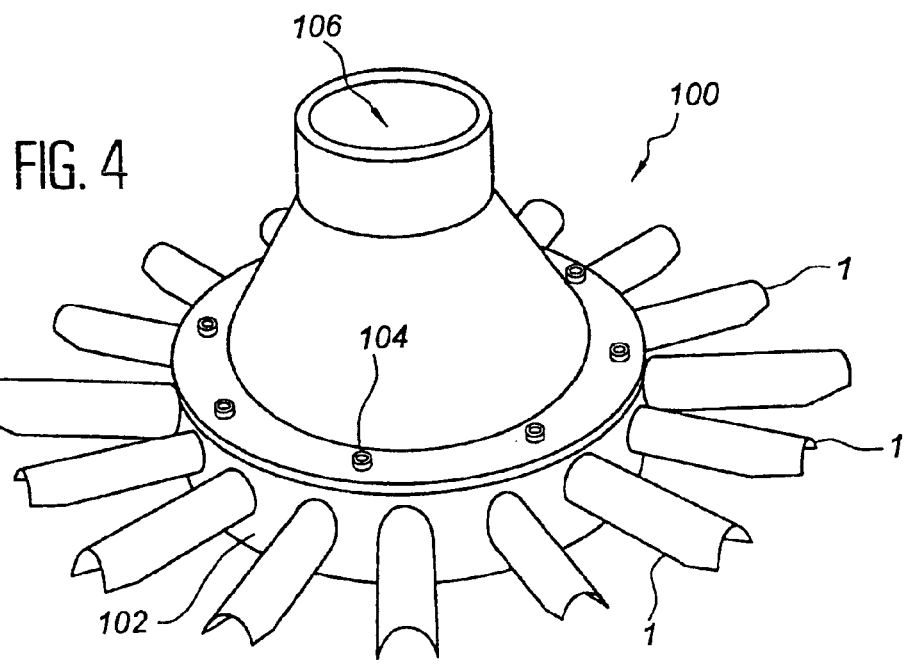
FIG. 4 is a diagram of an embodiment of the device according to the invention comprising 16 modules.

It is based on a star mounting of 16 modules of the present invention. This device is shown in the accompanying FIGS. 4, 5 and 6.

In these Figures, the reference 100 indicates the device of the present invention, reference 102 a fixed support, reference 1 the modules of the present invention, reference 104 fixing means, and reference 106 the gas inlet.

Figure 5:
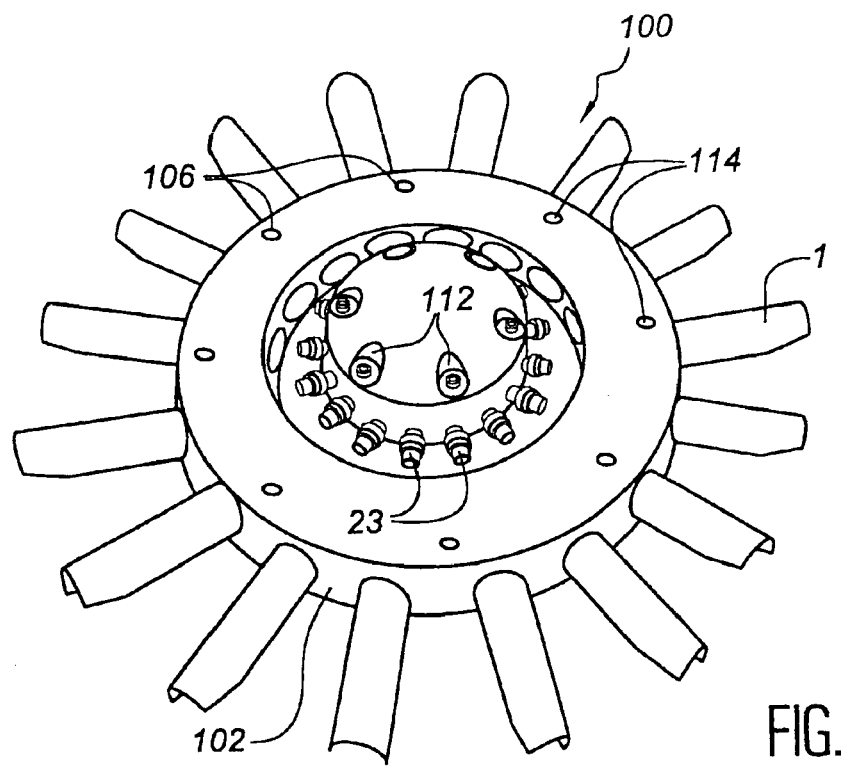
FIG. 5 is a diagram of the device of the present invention shown in FIG. 4 with the upper portion removed, in which the nozzles are visible.

In FIG. 5, the device 100 is open, and the nozzles 23 are visible, distributed in a star formation. Reference 106 denotes the holes for the fixing means 104, and reference 107, fixing means for the support of the nozzles.

In FIG. 6, reference 110 denotes the liquid inlet tube into the device of the present invention, placed below the device.

Its operating characteristics are as follows:

Liquid flow rate: 16 $m^3.h^{-1}$ for a pressure of 1.9 bar,

Maximum flow rate of treated gas: 640 $m^3.h^{-1}$,

Mean gas speed in the channels for 500 $m^3.h^{-1}$: 18 $m.s^{-1}$.

This generator provides the possibility of operating in a very wide range of flow rates by neutralizing a portion of the modules.

The Figures show this device in its construction from PVC and stainless steel.

It is operated with water with and without surfactant for a gas flow rate of 500 $m^3.h^{-1}$, and enables excellent results to be obtained of dispersion of gas in the liquid.

Example 6

Utilization of the Present Invention for the Generation of a Foam

This example shows the utilization of a module of the present invention for contacting a gas, air in this case, with a liquid including a foaming agent.

Using the module of the present invention, with 0.05% by weight of an ORAMIX®/amonyl mixture, the trials confirmed-the good quality of the foam obtained Indeed, a fine form with bulking, that is, a gas/liquid ratio, close to 20 was obtained.

The pilot device was tested with and without the tube provided with the impact plate. In the first configuration, the foam, not very regular, took several tens of seconds to occupy ¾ of the volume of the enclosure. On the contrary, with the module of the present invention, a very fine and homogeneous foam was generated, filling the same volume in less than 10 s.

Example 7

Simulation of the Decontamination of a 2 $m^3$ Tank

Trials of generation of a greater volume than in the preceding example, of the order of 2 $m^3$ at a flow rate of 25 $m^3.h^{-1}$, were performed in the context of a study of decontamination of tanks.

These trials confirm the above results: the foam obtained is of good quality, with bulking (gas/liquid ratio) of the order of 20.

What is claimed is:

1. Method of contacting a gas and a liquid, in which:
   in a substantially horizontal tube immersed in the liquid, starting from means for introducing the gas into the tube disposed between the first and the second end of the tube, bringing about a gas flow filling the tube and displacing toward the second end of the tube, and
   the liquid in the form of a jet is sent into the gas flow from the first end of the tube in the form of a jet along a first direction substantially parallel to the tube axis and not coming into contact with the tube onto a wall inclined at an angle of 35–55 degrees with respect to the first direction, the wall dispersing the jet of liquid into the gas, an opening being provided in the tube in the region of its second end so that the liquid leaves the tube with the gas as soon as the jet is dispersed by the wall.

2. Method according to claim 1, wherein the jet is a rectilinear jet.

3. Method according to claim 1, wherein the jet has a pressure of $2 \times 10^5$ to $5 \times 10^5$ Pa.

4. Method according to claim 1, in which the jet is substantially horizontal.

5. Method according to claim 1, wherein the wall has a free edge and the jet is sent onto the wall in the neighborhood of this free edge.

6. Method according to claim 1, wherein the gas flow is brought about by introducing the gas under pressure into the tube.

7. Method according to claim 1, wherein the gas flow is brought about by a reduced pressure in the region of the second end of the tube.

8. Method according to claim 1, wherein the wall is inclined so that the jet is dispersed downward.

9. Method of treatment of wastewater by oxygenation or ozonization, wherein the oxygenation or ozonization is performed by means of a method according to claim 1, wherein the gas is oxygen or ozone and the liquid is the wastewater to be treated.

10. Method of treatment of a polluted gas by bubbling by means of a treatment liquid, the said method comprising a step of contacting the gas and the treatment liquid by means of a method according to claim 1, wherein the gas is the polluted gas and the liquid is the gas treatment liquid.

11. Method according to claim 10, wherein the treatment liquid comprises a foaming agent permitting formation of foam from the gas to be treated and the treatment liquid.

12. Method according to claim 11, furthermore comprising a step of separation of the treated gas from the formed foam.

13. Utilization of the method of contacting a gas and a liquid according to claim 1 for effecting a chemical or biochemical reaction or a physical exchange with or without particles suspended in the gas or in the liquid.

14. Module (1) for contacting a gas and a liquid, comprising:
   a tube (3), substantially horizontal, comprising a first (5) and a second (7) end,
   means (21) for introducing the gas into the tube, disposed between the first (5) and the second (7) end of the tube,
   means for sending the liquid in the form of a jet (9) parallel to the axis of the rube (3) in the direction of the second end (7) of the tube, the jet (9) not coming into contact with the tube (3), this means being disposed in the region of the first end(S) of the tube,
   a wall (11) for intact of the jet (9), projecting into the tube (3) in the region of its second end (7), the wall (11) being inclined at an angle of 35–55 degrees with respect to the axis of the tube (3), the wall (11) having a free edge in the tube and having a position such that the jet comes totally into impact against the said wall in the neighborhood of the said free edge, and
   an opening (15) provided in the tube (3), in the region of the second end (7) of the tube (3), so that the jet dispersed by its impact on the wall leaves the tube directly.

15. Module according to claim 14, wherein the means (23) for sending the liquid in the form of a jet is a nozzle with a rectilinear jet.

16. Module according to claim 14, wherein the impact wall (11) is disposed such that it disperses the jet (9) of liquid downward.

17. Module according to claim 14, wherein the impact wall (11) forms a barrier to the gas introduced into the tube to force the entrainment of the gas by the jet dispersed by the wall.

18. Module according to claim 14, wherein the impact wall (11) is fixed to the tube (3).

19. Module according to claim 14, wherein the wall (11) projects into the tube (3) by about ⅓ of the tube diameter.

20. Module according to claim 14, wherein the wall (11) is inclined at an angle of 42 to 47 degrees.

21. Module according to claim 14, wherein the wall (11) is a plate.

22. Module according to claim 14, wherein the tube has a diameter of 32 mm.

23. Device (100) for placing in contact a gas and a liquid, comprising a plurality of modules (1) for contacting a gas and a liquid according to claim 14.

24. Device according to claim 23, wherein the modules (1) for contacting a gas and a liquid arc fixed in a star formation on a support (102).

25. Device according to claim 23 comprising 16 modules (1).

26. Device according to claim 24 comprising 16 modules (1).

* * * * *

UNITED STATES PATENT AND TRADEMARK OFFICE
CERTIFICATE OF CORRECTION

PATENT NO. : 6,905,610 B2  
DATED : June 14, 2005  
INVENTOR(S) : Turchet et al.

It is certified that error appears in the above-identified patent and that said Letters Patent is hereby corrected as shown below:

Column 11,
Line 14, after "tube" please insert -- , -- (comma).

Column 12,
Line 9, please delete "rube" and insert therefor -- tube --.
Line 12, please delete "end(S)" and insert therefor -- end (5) --.
Line 13, please delete "intact" and insert therefor -- impact --.

Signed and Sealed this

Eleventh Day of October , 2005

JON W. DUDAS
*Director of the United States Patent and Trademark Office*